(12) United States Patent
Gilder et al.

(10) Patent No.: US 7,539,646 B2
(45) Date of Patent: May 26, 2009

(54) FINANCIAL PAYMENT SYSTEMS AND METHODS USING PAPERLESS CHECK 21 ITEMS

(75) Inventors: Clark S. Gilder, Alpharetta, GA (US); Michael G. Lalonde, Alpharetta, GA (US)

(73) Assignee: Global Standard Financial, Inc., Alpharetta, GA (US)

( * ) Notice: Subject to any disclaimer, the term of this patent is extended or adjusted under 35 U.S.C. 154(b) by 6 days.

(21) Appl. No.: 11/870,075

(22) Filed: Oct. 10, 2007

(65) Prior Publication Data

US 2008/0086421 A1    Apr. 10, 2008

Related U.S. Application Data

(60) Provisional application No. 60/850,536, filed on Oct. 10, 2006.

(51) Int. Cl.
G06Q 40/00 (2006.01)

(52) U.S. Cl. .......................... 705/44; 705/40

(58) Field of Classification Search .................. 705/44, 705/39
See application file for complete search history.

(56) References Cited

U.S. PATENT DOCUMENTS

| | | | |
|---|---|---|---|
| 5,237,159 A | 8/1993 | Stephens | |
| 5,283,829 A | 2/1994 | Anderson | |
| 5,484,988 A | 1/1996 | Hills et al. | |
| 5,594,225 A | 1/1997 | Botvin | |
| 5,677,955 A | 10/1997 | Doggett et al. | |
| 5,783,808 A | 7/1998 | Josephson | |
| 5,848,400 A | 12/1998 | Chang | |
| 5,884,288 A | 3/1999 | Chang et al. | |
| 5,903,878 A | 5/1999 | Talati et al. | |
| 5,910,988 A | 6/1999 | Ballard | |
| 6,032,137 A | 2/2000 | Ballard | |
| 6,164,528 A | 12/2000 | Hills et al. | |
| 6,283,366 B1 | 9/2001 | Hills et al. | |
| 6,354,491 B2 | 3/2002 | Nichols et al. | |
| 6,411,942 B1 | 6/2002 | Fujimoto | |
| 6,547,129 B2 | 4/2003 | Nichols et al. | |
| 6,789,068 B1 | 9/2004 | Blaze et al. | |
| 6,990,224 B2 | 1/2006 | Warren et al. | |
| 7,103,579 B1 | 9/2006 | Phillips et al. | |
| 7,113,925 B2 | 9/2006 | Waserstein et al. | |

(Continued)

OTHER PUBLICATIONS

ING Direct, "http://home.ingdirect.com/about/about.asp?s=News06" Archived 2006 News and Press Releases, Apr. 11, May 12, Aug. 11, Nov. 26.*

(Continued)

*Primary Examiner*—Kambiz Abdi
*Assistant Examiner*—Lindsay M. Maguire
(74) *Attorney, Agent, or Firm*—Clements Bernard Miller; Lawrence A. Baratta, Jr.; Christopher L. Bernard

(57) ABSTRACT

Exemplary embodiments provide a digitally originated check (DOC) through an electronic payment system (EPS) which captures payor metadata instructions regarding the intended payment to a payee. The metadata may be stored in a database or the like for further processing instead of printing a paper check. An output of the metadata can be used to clear the DOC through either paper or electronic clearing mechanisms under Check 21.

14 Claims, 7 Drawing Sheets

U.S. PATENT DOCUMENTS

| | | |
|---|---|---|
| 7,131,571 B2 | 11/2006 | Swift et al. |
| 7,175,074 B2 | 2/2007 | Mejias et al. |
| 7,231,068 B2 | 6/2007 | Tibor |
| 2001/0044764 A1 | 11/2001 | Arnold |
| 2002/0065786 A1 | 5/2002 | Martens et al. |
| 2002/0120846 A1 | 8/2002 | Stewart et al. |
| 2003/0046229 A1 | 3/2003 | Cresswell |
| 2003/0083967 A1 | 5/2003 | Fleming |
| 2003/0093368 A1 | 5/2003 | Manfre et al. |
| 2003/0187797 A1 | 10/2003 | Song et al. |
| 2004/0199462 A1 | 10/2004 | Starrs |
| 2004/0236688 A1 | 11/2004 | Bozeman |
| 2005/0161502 A1 | 7/2005 | Smith, Jr. et al. |
| 2006/0045321 A1 | 3/2006 | Yu |
| 2006/0161501 A1 | 7/2006 | Waserstein et al. |
| 2006/0273165 A1 | 12/2006 | Swift et al. |
| 2007/0022053 A1 | 1/2007 | Waserstein et al. |
| 2007/0130063 A1 | 6/2007 | Jindia et al. |
| 2007/0175977 A1 | 8/2007 | Bauer et al. |
| 2007/0194102 A1 | 8/2007 | Cohen |
| 2007/0288380 A1 | 12/2007 | Starrs |

OTHER PUBLICATIONS

Doggett, "Electronic Checks—A Detailed Preview", Journal of Retail Banking Services, Summer 1996, vol. XVIII, No. 2, ABI/INFORM Global.

Murphy, "The Check Is In The Email", Bank Technology News, 12 (9): 49+, Sep. 1999. Copyright 1999 Thomson Media.

wikipedia.org, "Globally Unique Identifier," http://en.wikipedia.org/wiki/GUID.

wikipedia.org, "Personal Identification Number" http://en.wikipedia.org/wiki/Personal_identification_number.

Cocheo, "One-Click check presentment", American Bankers Association, ABA Banking Journal, Nov. 2000, pp. 48,58-62.

* cited by examiner

```
                                    ┌─10
                                    ⌐

┌─────────────────────────────────────────────────────────────┐
│                                                             │
│                      ┌──────────────────────────────────────┤
│  •003456789•         │ John or Jane Doe              147    │
│  11/02/2004          │ PO Box 123                           │
│  1234567890          │ Home Town, MD 83801   Date: Oct. 11, 2004 │
│                      │                                      │
│                      │ Pay to:  Fairtime Mortgage Co.  $ 450.34 │
│  This is a legal copy of │ Four Hundred, Fifty, and 34/100 ──── DOLLARS │
│  your check. You can use │                                  │
│  it the same way you │                                      │
│  would use the original │ Payment 36              Jane Doe   │
│  check.              │                                      │
│                      │ I:1000110001/:I  I:00001234:I I0147 -000045034- │
│                      ├──────────────────────────────────────┤
│                      │                        ╲              │
│                      │  090909892            ╱               │
│                      │  Truncate Bank                For Deposit Only │
│                      │                              Deposit Bank National │
│                      │                              Account 121234456 │
│                      │                              Fairtime Mortgage Co. │
│                      │          11222331                    │
│                      │      Deposit Bank National           │
│                      │         Philadelphia                 │
│                      │          678787878                   │
│                      └──────────────────────────────────────┤
│                                                             │
│   I:1000110001/:I    I:00001234:I I0147   -000045034-       │
│                                                             │
└─────────────────────────────────────────────────────────────┘

*Figure 1*        Prior Art
```

FINANCIAL PAYMENT SYSTEMS AND METHODS USING PAPERLESS CHECK 21 ITEMS

CROSS-REFERENCE TO RELATED APPLICATION(S)

The present non-provisional patent application claims priority to U.S. Provisional Patent Application Ser. No. 60/850,536, filed Oct. 10, 2006, and entitled "FINANCIAL PAYMENT SYSTEMS AND METHODS," the contents of which are incorporated in full by reference herein.

FIELD OF THE INVENTION

An exemplary embodiment relates generally to financial payment systems and methods, and, more particularly, provides systems and methods for a paperless Check 21 item that performs as a digitally originated check which is compliant with Check 21 regulations and which can be utilized in digital form from creation to clearing without the requirement to create a paper check.

BACKGROUND

Checks are negotiable instruments regulated in the United States under Uniform Commercial Code (U.C.C.) Articles 3 and 4. Traditionally, checks are paper instruments created by a payor filling in a pre-printed form on check stock paper where the payor inputs by handwriting, typing, or printing the required payment information. This paper check is then sent out using the mail, overnight delivery, hand delivery, or the like, but, in the end, the paper check is physically delivered directly to a payee to satisfy a debt. Upon receipt, the payee deposits the paper check into their bank for credit to their own account. The depositing bank bundles all of the paper checks together and sends them to the bank's "Item Processing" department for processing (i.e., sorting, grouping and totaling) by high speed machinery. The purpose of this processing was to generate the necessary accounting entries needed to debit and credit the appropriate checking accounts and clear the payment. If the deposited check originated outside of the bank, the paper check must be forwarded for presentment to the originating (or paying) bank for payment. An alternative forwarded presentment model includes a remotely created check (i.e. paper check) by the payee. Note, the return process, such as for non-sufficient funds (NSF), works in a similar manner as the forward presentment model in reverse.

Traditionally, paper checks moved from the Bank of First Deposit (BOFD) to a clearinghouse, and then moved again from a clearinghouse to either another regional clearinghouse which was closer to the clearing bank (often times a Federal Reserve Bank in the issuing banks geographic area) or directly to the clearing bank. It is the clearing banks responsibility to validate the check, verify that the account exists and has sufficient funds and then pay the BOFD so it may credit the account of the depositing payee.

This dependence on the movement of paper (for security, authenticity, and processing/payment) created a multi-day processing period between the date of deposit and the date of payment and finally the date of credit to the payee's account. This movement of paper checks was a weakness in the United States financial system as checks have been the preferred method for making payments between individuals, businesses, and the government. Further, the movement of these paper checks frequently utilized the airline network to quickly move paper from one part of the country to another. Thus, when 9/11 struck and the airline fleets were grounded, the entire check clearing and payment system was severely impacted. This caused some checks to not be delivered and people were left without funds to pay for necessities. The aftermath of this transportation delay created huge political pressure on the government to eliminate the dependency on paper check clearing.

Prior to the Check 21 Act, a bank that presented a check for payment was required to present the original paper check unless the clearing bank had agreed to accept alternative presentment from the depositing bank in some other form such as electronic image exchange. §3-501(b)(2) and §4-110 of the Uniform Commercial Code (U.C.C.) specifically authorizes banks and other persons to agree to alternative means of presentment, such as electronic image presentment. However, in order to truncate checks early in the collection process and engage in broad-based electronic presentment, a collecting bank would need electronic presentment agreements with each bank to which it presents checks for collection. This limitation proved impracticable because of both the large number of banks and the unwillingness of some paying banks to receive electronic presentment. As a result of the difficulty in obtaining the agreements necessary to present checks electronically in all cases, prior to the Check 21 Act, banks had not been able to take full advantage of the efficiencies and potential cost savings of handling checks electronically.

The Check Clearing for the 21st Century Act (Check 21) became effective on Oct. 28, 2004. Check 21 was designed to foster innovation in the payments system and to enhance efficiency by reducing some of the legal impediments to check truncation (eliminating a paper check by converting it into a digital image and destroying the original paper item). The law facilitates check truncation by creating a new negotiable instrument called a substitute check, which permits banks to truncate original paper checks, to process check information electronically via exchange of check image files, and to deliver substitute checks to banks that want to continue receiving paper checks. A substitute check is created from a check image described by the X9.37 'ANSI' draft standard or the X9.140 and the X9.180 final standards, all of which are incorporated in-full by reference herein. This image file is a digital bitmap in Tagged Image File Format (TIFF) created by electronically scanning and imaging the front and back of the original paper check. The substitute check (also known as an Image Replacement Document (IRD)), is created by printing the front and back images along with some additional information on an 8.5×11 inch sheet of paper. Under the Check 21 law, this IRD is treated as the legal equivalent of the original check and includes all of the information contained on the original check. When printed, the images and data must conform to the X9.140 standard which is incorporated in-full by reference herein. The law does not require banks to accept checks in electronic form, nor does it require banks to use the new authority granted by the Act to create substitute checks. The law also does not authorize the payor to generate their own truncated item which satisfies all of the warranties and indemnities required to be acceptable substitute checks. Thus, while the law allowed banks to truncate checks by generating electronic items, end users, such as payors or payees, were not included in the original intent of the law nor were they conceived of as being part of the truncation concept.

Referring to FIG. 1, a substitute check (or IRD) 10 is a paper reproduction of an original check that contains an image of the front and back of the original check and is suitable for automated processing in the same manner as the original check. To clear a check for consideration for payment, the depositing bank transfers, presents, or returns the substitute check 10 (or another paper or electronic representation of a substitute check) and warrants that (1) the substitute check 10 contains an accurate image of the front and back of the original check and a legend stating that it is the legal equivalent of the original check, and (2) no depositary bank, drawee, drawer, or endorser will be asked to pay a check that it already has paid. The substitute check 10 for which a bank has made these warranties is the legal equivalent of the original check for all purposes and all persons.

Although Check 21 has facilitated the inter-bank exchange of electronic check images, it has not been fully utilized or enabled throughout the payment system by payors and payees due to a variety of issues surrounding either security weaknesses or legal gaps. These issues are currently viewed to be either unsolvable or to involve extreme changes to existing business methods which would need to be overcome before a wider adoption of Check 21 imaging concepts can be implemented across the payments industry to everyone. The first issue, in terms of general Check 21 industry implementation challenges, is the fact that frequently both the actual paper check and the Check 21 image may be cleared by the bank creating a double debit situation. Note that while the actual number of occurrences of these double debits has tended to be reduced as banks improve their internal Check 21 business methods and systems, these same well known debit issues are generally unavoidable for any bank first implementing a Check 21 style image clearing process for either the forward or return clearing cycles. Second, a variety of security issues are of grave concern to banks given the entire loss of the existing paper check security features which have been developed over the last 30 to 40 years as defined by the older X9 standards which are herein incorporated by reference in-full. These image security holes show up primarily in the payments industry when they contemplate the concept of having a customer present an image to a bank to be settled as a UCC check payment. Consider, for example, the case where a customer shows up with what looks like a Check 21 image in IRD form. As currently viewed by the industry, anyone with a modest degree of skill in digital graphics editing can create a valid, Check 21 like image using PhotoShop or other graphics software programs using stolen customer checking account or Demand Deposit Account (DDA) data to create a fraudulent check. Also, given the lack of security in paper IRDs, banks are reluctant to accept random IRDs for deposit, slowing down their acceptance as returned items. Finally, banks do not believe that end users or customers are permitted under the existing Check 21 act to create check images or substitute checks. So from the industry viewpoint, there are legal and regulatory barriers that must be overcome before Check 21 items could be viable consumer payment mechanisms. These problems must be overcome before the concepts of Check 21 can be applied to everyone—allowing users to receive the benefits of Check 21 that are already being received by the banks. The benefits of paperless Check 21 item origination and processing include faster delivery, as well as the lower costs from securely and efficiently processing payments and the reduced clearing time and reduced risk exposure from unknown payor items drawn on out of town banks. Finally, if properly implemented, the concepts provided by the Check 21 act would enable everyone from consumers to businesses to governments to charities to create and effectively process secure electronic payments in a manner similar to existing low cost electronic payment methods such as Electronic Check Automated Clearing House (ACH) items covered under the National Clearinghouse Association (NACHA) rules.

Referring to FIG. 2, conventionally under Check 21, substitute checks or IRDs are only utilized between banks, such as clearing banks, banks of first deposit (BOFD), and the like. A flowchart 20 illustrates an exemplary embodiment of Check 21 under conventional operation. First, a payor drafts a paper check payment from their demand deposit account (DDA) bank (step 22). Next, the paper check is physically delivered, such as mailed, hand delivered, etc., to a payee (step 24). The payee manually deposits the paper check into their bank account (step 26). The bank where the payee deposits the check is referred to as a bank of first deposit (BOFD). Once in the BOFD, the paper check is sorted and converted into a substitute checking according to the regulations under Check 21. The BOFD can pay the payee cash, credit the payee's account, or the like (step 30) once the check has been deposited into the payee's account. Also, the BOFD initiates the clearing process with the substitute check through a traditional clearinghouse or an Electronic Payments Clearinghouse (EPCH) or the like (step 32). The clearing process moves the substitute check to a clearing bank, i.e. the bank with the DDA account of the payor, and the clearing bank validates the substitute check data, verifies the account exists with sufficient funds, and finally pays the BOFD (step 34). Finally, the clearing bank can use the substitute check image with the payor's monthly statement in lieu of paper checks (step 36).

Of note, the Check 21 Act does not require any bank to use electronic check processing, receive electronic presentment, or create substitute checks based on check images. However, after the effective date of the Check 21 Act, any bank that requires an original check must accept a legally equivalent substitute check in satisfaction of that requirement. As a result, for the most part, banks would not be required to change their check processing equipment or practices because of the Check 21 Act, and there would be no need for a bank to sort original checks and substitute checks separately during the check collection process. Using the substitute check format, banks which choose to use image processing during their check collection and clearing process are allowed to do so while maintaining backwards compatibility with banks which do not have the ability to electronically process image files. For example, in the past, a depositary bank in California that receives a check drawn on a bank in New York would transport the original paper check back to New York for payment. Now under Check 21, a substitute check image file can be sent to the New York bank without specific prior contractual agreement or consent by the New York bank to the California bank. Now, if needed, the New York bank (or its agent) can receive the image file and print it in IRD or substitute format and continue to process the re-created paper check using their traditional check clearing process. In summary, Check 21 allows banks that wish to image checks and exchange image files to do so while still allowing some banks to receive compatible paper checks based on Check 21 image files.

Electronic payments and images and the like contain raw data which constitutes the item itself, however there is another form of data called "metadata". Metadata is data about data. An item of metadata may describe an individual datum, or content item, or a collection of data including multiple content items. Metadata is used to facilitate the understanding, use, and management of data. The metadata required for effective data management varies with the type of data and context of use. The concept of "generating a bitmap image from metadata" is foreign to banks, but common in the computer graphics industry. Thus, those skilled in the art of payments are generally not familiar with concepts utilized by well known computer bitmap "rasterization" algorithms to produce images. However, as is known by those skilled in computer graphics, it is often easier and more convenient to generate bitmap images dynamically from metadata. Further, there is no nexus between bitmap generation and graphics with the payment system, checks, or legal contracts, the UCC and the like. Finally, to make an electronic check image payment system acceptable to banks, additional security is required to protect banks from accepting fraudulent images (e.g., created by hackers using a graphics program). Additionally, banks have made a large investment in paper check imaging equipment, thus there is no incentive to pay for the designing and building of new software systems to enable end user created paperless Check 21 items. Additionally, there is little to no existing Public Key Infrastructure (PKI) security infrastructure or systems currently at banks (other than Secure Sockets Layer (SSL) keys for website security) which could facilitate end user digital signing of Check 21 images.

Thus, conventional mechanisms in the banking and payment industry include imaging of paper checks. Check 21 only allows banks to truncate paper checks to create Check 21 items. Additionally, it is well known by those skilled in the art of payments that Remote (electronic) Deposit (RD) services are currently available to businesses. RD systems enable the business, as a payee, to scan the paper checks they receive and remotely deposit the items into their bank. However, these RD items are cleared through the ACH network as POP or ARC items, not as UCC items. Thus, no mechanism exists to allow UCC based electronic checks to flow through the entire check payment system without reduction to paper at some point and or conversion into another payment type. Existing ACH "electronic check" prior art does not solve these problems as these all disclose a paper check in one form or another in the process. Further, these ACH "electronic" checks do not comply with ANSI X9 image standards.

BRIEF SUMMARY OF THE INVENTION

Exemplary embodiments provide a system and method that creates a paperless Check 21 item extending the benefits of electronic check payments to everyone. One embodiment uses a digital origination process through an electronic payment system (EPS) to create valid UCC payment items—e.g. a Digitally Originated Check (DOC). The EPS captures payor instructions regarding the intended payment to a payee as metadata which is stored for later use in the digital origination of paperless Check 21 items. The payment metadata may be stored in a database or the like for further processing instead of printing a paper check.

Advantageously, an embodiment allows payors and payees to utilize paperless Check 21 items, i.e. DOCs, through the banking system without ever reducing it to a paper medium. This allows the use of the Check payment system in place of debit cards, ACH transfers, credit cards, and the like. An embodiment may include mechanisms to enable substitute checks or electronic metadata files to be utilized by payors and payees without requiring paper checks. The key enablers to open the check payment system to paperless items include a contractual framework between payor and payee authorizing the DOC to comply with indemnities and warranties associated with paper checks, security and tracking features to verify origination and movement, and computer graphics metadata rasterization techniques to fully comply with all ANSI X9 standards to ensure full compatibility with Check 21.

In an exemplary embodiment, a paperless check method includes: (a) presenting the payor with a set of warranties and indemnities applicable to banks of first deposit and clearing banks, wherein the set of warranties and indemnities extend Check 21 regulations between the payor and a payee and through the banks of first deposit and clearing banks, and wherein the set of warranties and indemnities enables the payor to provide a digitally originated check to a payee; (b) receiving an acceptance from the payor of the set of warranties and indemnities; (c) receiving a payment instruction from the payor to the payee, wherein the payment instruction is subject to the set of warranties and indemnities; (d) capturing metadata associated with the digitally originated check, wherein the digitally originated check is created by the payor without an original paper check, and wherein the metadata includes the payment instruction, a globally unique identifier, tracking information, and security information; and (e) performing one or more of immediately notifying the payee of the digitally originated check and notifying the payee of the digitally originated check at a later time; wherein an output from the metadata is interoperable with both paper and electronic clearing methods associated with Check 21 clearing systems. Optionally, the paperless check method further includes (f) authenticating the payee; (g) presenting the payee with the set of warranties and indemnities; (h) receiving an acceptance from the payee of the set of warranties and indemnities; and (i) performing one of electronically forwarding the metadata to a bank of first deposit as an electronic Cash Letter File compliant to X9.180 and printing a substitute check compliant to X9.140 from the metadata. The security information is operable to prevent tampering with the payment instructions and the substitute check. Optionally, the paperless check method further includes: (j) electronically endorsing the digitally originated check. The payment instructions can include any of conditions, limitations, restrictions, conditional acknowledgements comprising business rules governing payment terms, and combinations thereof. Optionally, the tracking information is operable to provide an audit history of the digitally originated check. Alternatively, the security information includes a personal identification number defined by the payor for secure retrieval by the payee.

In another exemplary embodiment, a paperless check system includes (a) data storage including a metadata file, wherein the metadata file is associated with a digitally originated check, wherein the digitally originated check is created by a payor without an original paper check, and wherein the metadata file includes a payment instruction, a globally unique identifier, tracking information, and security information; (b) a network interface connected to the data storage; and (c) a processor connected to the network interface and the data storage. The processor is configured to: (i) present a set of warranties and indemnities applicable to the payor; (ii) receive acceptance of the set of warranties and indemnities from the payor; (iii) receive payment instructions from the payor; (iv) create the metadata file with the payment instruction from the payor; (v) generate and assign the globally unique identifier to the metadata file; (vi) notify a payee of the metadata file associated with the digitally originated check; (vii) track the digitally originated check and update the metadata file with an audit history of the digitally originated check; and (viii) authenticate the digitally originated check. The set of warranties and indemnities extend Check 21 regulations between payor and payee and through associated banks of first deposit and clearing banks, the set of warranties and indemnities enables the payor to provide a digitally originated check to a payee, and an output the metadata file is interoperable with both paper and electronic clearing methods associated with Check 21 clearing systems. Optionally, the processor is further configured to: (ix) authenticate the payee associated with the metadata file; (x) present the payee with the set of warranties and indemnities; (xi) receive acceptance of the set of warranties and indemnities from the payee; and (xii) perform one of electronically forwarding the metadata file to a bank of first deposit as an electronic Cash Letter File compliant to X9.180 and printing a substitute check compliant to X9.140 from the metadata file.

BRIEF DESCRIPTION OF THE DRAWINGS

Exemplary embodiments are illustrated and described herein with reference to the various drawings, in which like reference numbers denote like method steps and/or system components, respectively, and in which:

FIG. 1 is an exemplary illustration of a substitute check (or IRD);

DETAILED DESCRIPTION

Figure 2:
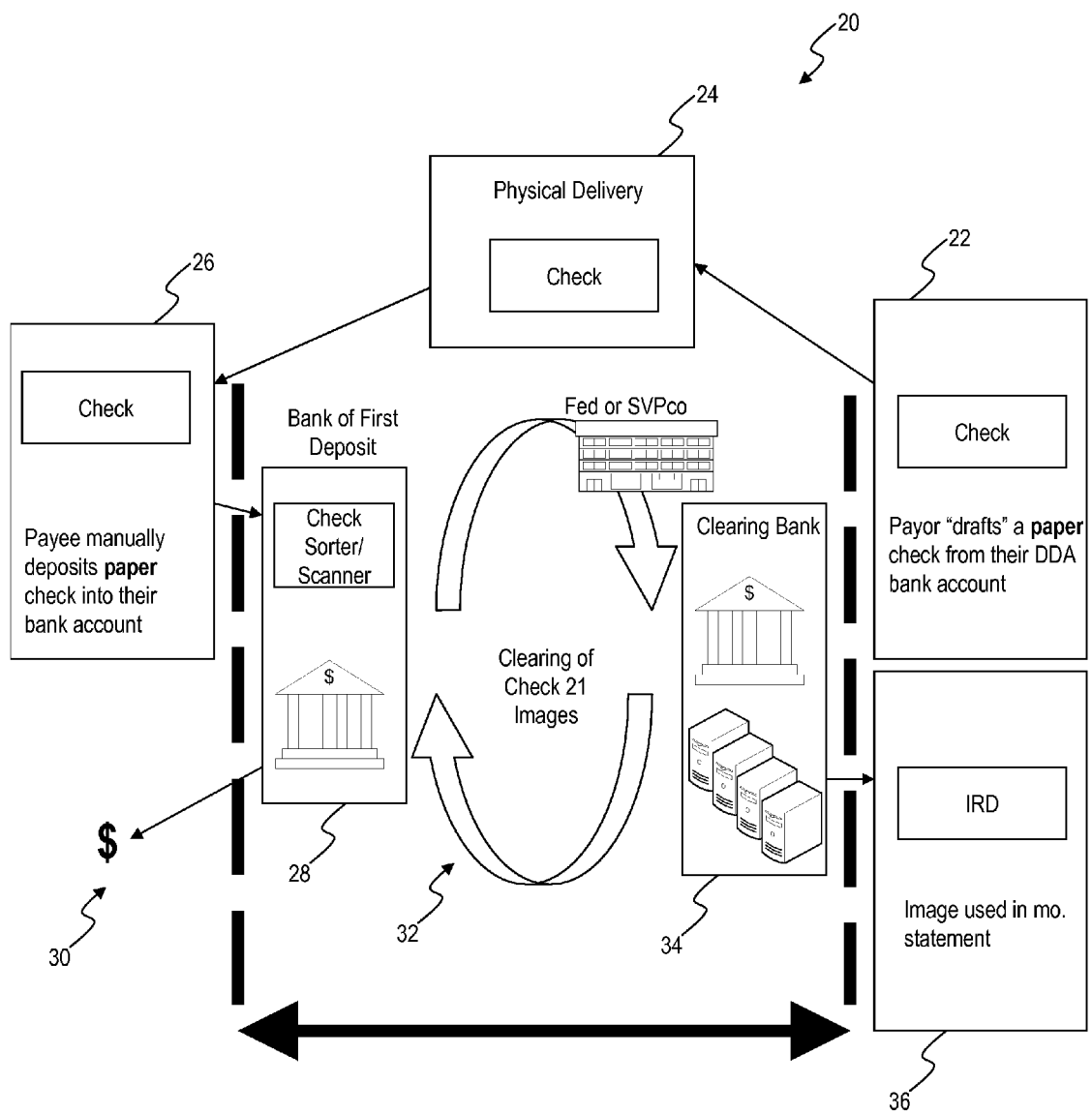
FIG. 2 is an exemplary flowchart illustrating the flow of checks and substitute checks conventionally under Check 21.

Various exemplary embodiments provide a mechanism to generate and process paperless Check 21 items which can be described as digitally originated checks (DOC) processed using an electronic payment system (EPS) which captures payor "metadata" which are instructions regarding the intended payment from a payor to a payee. The metadata may be stored in a database or the like for further processing instead of printing a paper check. The type of data captured can include traditional information stored on the front of a paper check, such as instructions for "whom to pay" (payee name, phone number or email address), some value amount (input as a decimal number of some currency), the payment issue date, the bank account number from which the payment is to be drafted (traditional checking account number and ABA bank routing number), along with some potential set of conditions, limitations, or restrictions, along with memo field description details, and potentially some type of conditional acknowledgements which are defined to be business rules governing how and when the payment should be made (i.e., putting a contract on the back of a check, thus cashing the check is endorsing the contract).

These payment instructions or "metadata" can be captured or generated in a variety of ways or methods implemented by the electronic payment system (i.e. an EPS can have multiple input forms). For example, a human user can use a variety of system interface choices including an Internet webpage to input the required metadata to generate the DOC payment. Alternatively, a telephony device (cell phone, or land line, via an IVR call center system) or an Internet browsing enabled mobile device (PDA) could be used to login and generate the payment. Additionally, the metadata could be generated by a user using a home or office PC software application such as Intuit Quicken, Microsoft Money, or other accounting software programs. Exemplary embodiments also contemplate the option of having no human user intervention by supporting generation of DOCs via an automated software program. This software program could generate pre-scheduled DOC payments with information stored in a payment database to send the resulting DOC files directly into the banking system for payroll or automated accounts payable type business scenarios.

In order to provide paperless Check 21 items, exemplary embodiments may utilize several elements. First, a framework of knowledge and understanding of the Check 21 law and Check 21 standards X9.37, 140 and 180, which are incorporated in-full by reference herein, are utilized to enable paperless Check 21 items. Additionally, knowledge and understanding of the payments industry including Item Processing, UCC law, Electronic Funds Transfer (EFT) law, and how the "gaps" between Check 21, UCC, and EFT law are filled. Of note, exemplary embodiments utilize a contractual relationship between a payee and payor to extend Check 21 warranties throughout the system for DOCs. These warranties enable electronic presentment from payees and payors despite the conventional belief that paper checks are required. §3-501(b)(2) and §4-110 of the Uniform Commercial Code (U.C.C.) specifically authorize banks and other persons to agree to alternative means of presentment, such as electronic image presentment. Exemplary embodiments leverage these concepts to provide a UCC compliant, secure, and Check 21 compliant item in the form of the DOC. Note, the exemplary embodiments can include both forward and return presentment under Check 21.

Additionally, exemplary embodiments may utilize knowledge and understanding of how bitmaps are generated in applications such as GUI operating systems, fonts and graphics drivers for video cards. Additionally, the invention utilizes graphics techniques used by Internet websites as well as how software applications capture data and store and manage that data as file input into other business processes (ex. clearinghouses). Further, exemplary embodiments may include knowledge and understanding of security concepts: PKI and Certificate Authorities (CAs), cryptography, steganography, SSL, digital signatures using public and private keys, and the like. The exemplary embodiments may leverage knowledge and understanding of the weakness of images produced by existing bank Item Processing check sorting machines, including skew, image quality tests and Optical Character Recognition (OCR) processing errors. Also, the present invention includes knowledge and experience with software design and architectures, programming languages, character encoding (ASCII, EBCDIC, Unicode) in electronic file formats, software internationalization and localization, and database design including the Structured Query Language (SQL) language.

Figure 3:
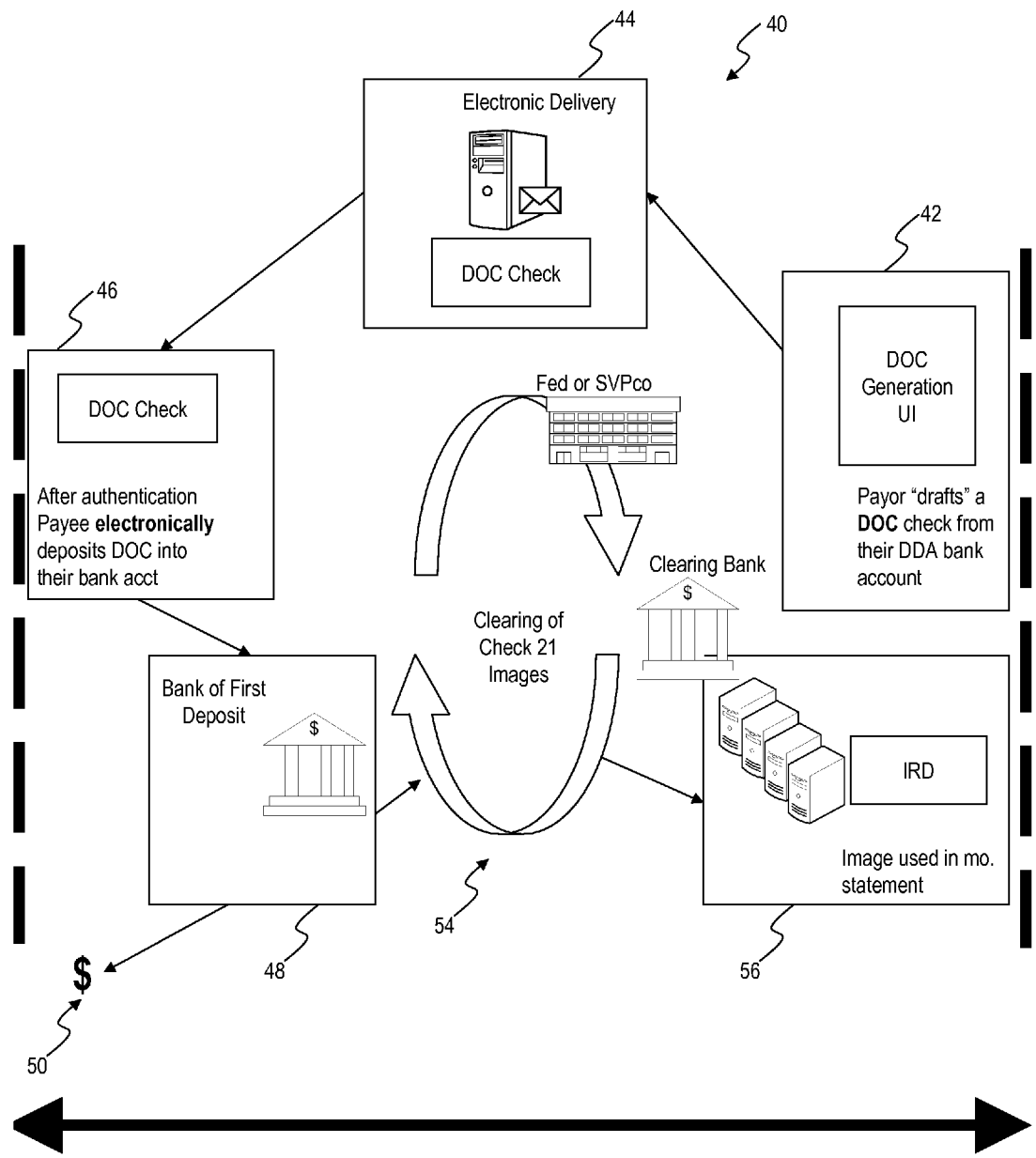
FIG. 3 is an exemplary flowchart illustrating the flow of a DOC processed electronically throughout a banking system, according to an exemplary embodiment of the present invention.

Referring to FIG. 3, in an exemplary embodiment, a DOC is processed electronically throughout a banking system 40. First, a payor 'drafts' a DOC check from their DDA bank account (step 42). The DOC may be created through an EPS, and the DOC is a valid UCC draft in electronic form under the Check 21 X9 standards. The DOC may be created with user initiated instructions to pay someone (i.e. a payee), some value amount, under a set of conditions, limitations, restrictions, acknowledgements, and the like. These instructions may be stored in a database—e.g. a Digital Payment File (DPF). These digital instructions are used to create a perfect digital check, and there may be no paper check required to create these instructions and there may be no paper origination or scanning.

Delivery of the DOC to the payee may be electronic (step 44), and the payee can be notified. This notification mechanism can take a variety of forms of messaging from the EPS such as an email message (e.g., with an embedded URL with transaction ID to automate the retrieval of the DOC, an embedded file, and the like), a phone call, a pager message, a fax message, an Instant Message (IM), or the like. The notification can be immediate after creation of the DOC or at a later time, such as with future planned payments. Once the payee has responded to the EPS notification message, the payee may use a unique transaction identification known as a Globally Unique Identifier (GUID) which was provided to them in the notification message to identify which specific DOC to retrieve. The GUID is a special type of identifier used in software applications in order to provide a reference number which is unique in the context for which it is used, for example, in defining the internal reference for a type of access point in a software application, or for creating unique keys in a database. In the exemplary embodiments, the GUID may be sufficiently large to avoid object collisions, i.e. duplicate numbers, and it utilizes an algorithm to ensure GUIDs cannot be spoofed.

The EPS can use the GUID to lookup the DOC transaction and determine how to authenticate the payee based on an authentication level chosen by the payor when sending the DOC (or setup by the payee as a condition for retrieving payments from the EPS under a specific name or ID). Authentication levels can include, none (i.e., just knowing the transaction ID or GUID is enough security for the payor), a unique PIN number for each DOC (e.g., PIN is sent separately by the payor, i.e. a phone call, or if sent via the EPS it is sent separately from the notification message), additional levels of credentials (e.g., unique account number and login ID into the EPS), private digital security signature key (e.g., using a public key cryptography system), or other level of security mechanism agreed to by one or both parties and supported by the EPS.

After satisfying the authentication and security tests, the payee may electronically retrieve a Check 21 image of the payment and verify that the payment information is correct. After retrieval of an image and verification, the payee can choose the method of depositing the DOC into her bank account (step 46). The exemplary embodiments provide the payee with multiple choices for depositing or clearing the payment. For example, the payee can retrieve a DPF record for the specific DOC (using the GUID), and the EPS can generate a DOC image (in Check 21 image format) and display it allowing the payee to confirm payment, correct amount, etc. After reviewing the DOC, such as through the EPS, the payee has a choice in how to proceed with claiming their payment. First, the payee can choose to physically print the DOC as an IRD onto paper using a printer, and physically depositing it at the bank like a traditional paper check, i.e. using X9.140 clearing methods. Further, the payee can have the EPS forward the DOC electronically into their bank as an Image Cash Letter (ICL) exchange for deposit saving the time and effort of a trip to the bank, i.e. using X9.180 clearing methods. For example, the forward deposit can use email to send the ICL to a known bank address, such as deposits@bankxyz.com, where the bank's computer system, utilizing an EPS appliance, can remove the attached ICL file to credit the deposited item. Also, the EPS can convert the DOC into another form of payment, such as Automatic Clearing House (ACH) and the like.

The BOFD (step 48) may provide the payee credit for the DOC (step 50) and clear the DOC through the normal clearinghouse process (step 54). As the DOC payment is processed or "cleared" by the banking system 40, the individual DOC file can subsequently be placed into a standard bank clearinghouse Cash Letter File (X9.180 standard) "bundle" along with other check items (i.e., digitally created or paper scanned images) and exchanged electronically with other banks. Currently, all of the traditional as well as image exchange payment clearinghouse (EPCH) mechanisms support Check 21 image file exchanges including the Federal Reserve System, ViewPointe, SVPco/The New York Clearinghouse and the like. Additionally, X9.37 type image files are used as the "accepted format" in many private two party (bank-to-bank) image exchange agreements. For example, banks, such as Wachovia and Bank of America, can exchange image files directly with each other under private clearing agreements in the X9.37 format. Finally, the DOC clears through the clearing bank, the clearing bank transfers the funds to the BOFD, and the clearing bank uses the DOC image in the payor's monthly statement (step 56).

Figure 4:
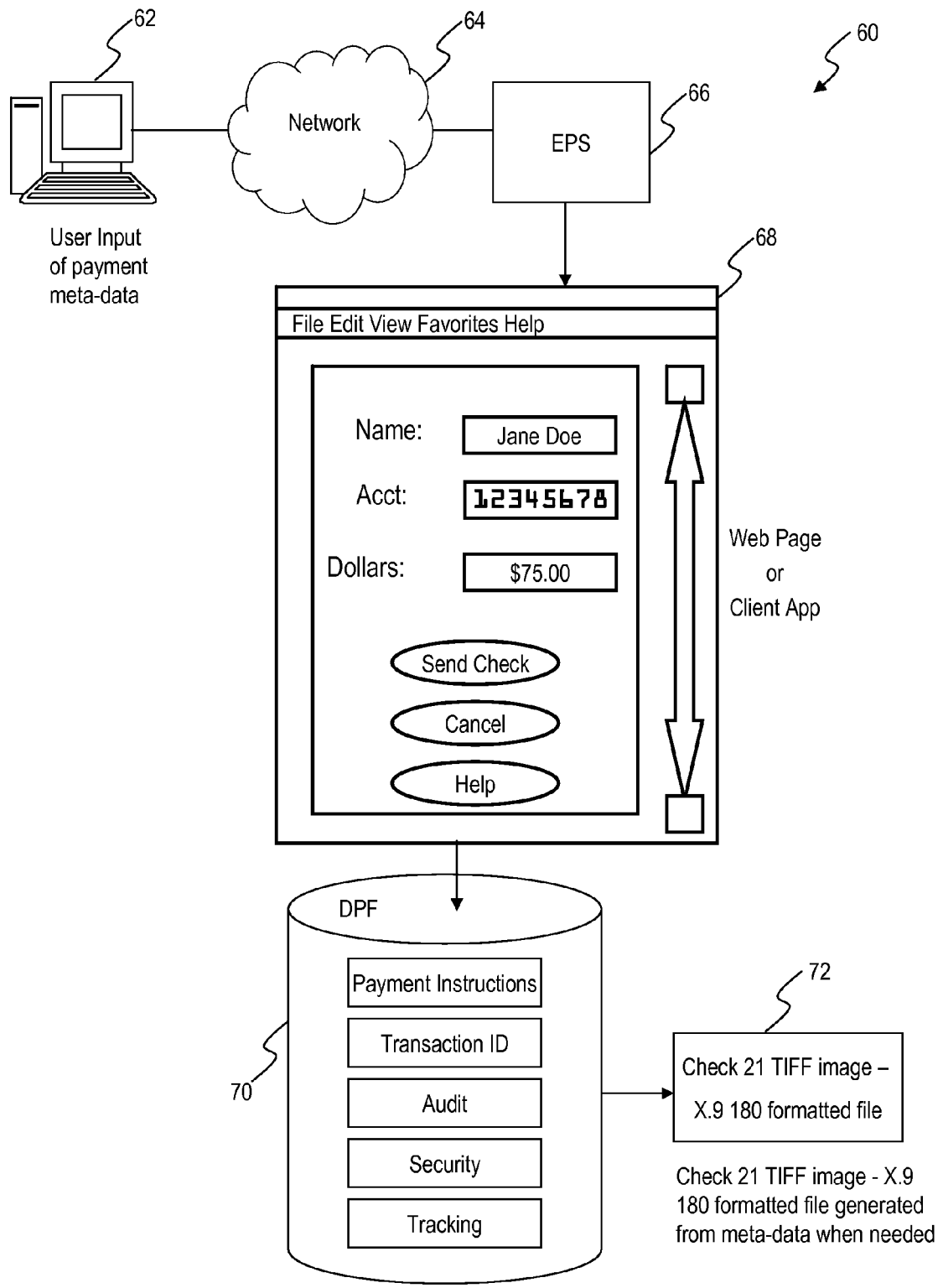
FIG. 4 is an exemplary flowchart illustrating DOC generation according to an exemplary embodiment of the present invention.

Referring to FIG. 4, an exemplary embodiment of DOC generation 60 is illustrated. In this exemplary embodiment, the DOC generation 60 utilizes a computer 62 connected through a network 64 (e.g., the Internet, cell phone network, wireless network, etc.) to an EPS 66. The EPS 66 may be an electronic system configured to interact with a plurality of users (i.e. payors and payees), banks, and other financial institution to enable DOC generation, distribution, tracking, authentication, security, clearing, and the like. The EPS 66 may be designed for high volume, highly reliable payment issuance, tracking and security. For example, the EPS 66 can include a redundant set of bank or clearinghouse payment network interconnections for switching or routing payments as well as redundant data networks along with redundant computer clusters with data storage connected to the Internet.

The EPS 66 may be configured to provide a variety of user interface options (UI) 68 for DOC generation 60. The UI 68 may enable a user to open an account, which stores the static payment information such as an American Bankers Association (ABA) routing number and account number, as well as separate UI forms for individual DOC creation or for scheduled automatic DOC creation and transmission, or for "one time" payment use. For example, the UI 68 can include input fields for traditional information stored on the front of a paper check, such as instructions for "whom to pay" (e.g., payee name, phone number, email address, physical address, and the like), value amount (e.g., input as a decimal number of some currency), the payment issue date, the bank account number from which the payment is to be drafted (i.e., traditional checking account number and ABA bank routing number). Additionally, the UI 68 can include a memo field describing the payment details, and potentially some level of security requirement such as a PIN number required to retrieve the specific DOC payment. Once the user inputs the data into the UI 68, the EPS 66 may generate metadata from the input. Note, the exemplary embodiments contemplate other mechanisms for generating the metadata, such as automatic processing, and the like.

Regardless of the mechanism of generating the metadata instructions, the resulting data values may be stored in a database record that is called a Digital Payment File (DPF) 70. The DPF 70 includes data in addition to the payment instructions, including a unique transaction ID along with other audit, security and tracking data needed for subsequent data processing of the specified payment. The DPF 70 also uniquely serves as an automatic payor "positive pay" file record to control clearing. Additionally, the exemplary embodiments can produce images 72 in the exact bitmap form and format required by the X9 specifications (X9.37 draft as well as X9.140 IRD final and X9.180 image & cash letter format).

Note that paperless Check 21 items or DOCs may be built using two key parts—first, the DPF 70 record which contains computer instructions and resulting "metadata" which are used, when needed, to create the second part, which is the computer generated "bitmap" image 72 of the front and back of a bank check along with additional data stored in a Check 21 Cash Letter record and bundle. The computer generation of the bitmap is called the "digital origination" to distinguish it from the traditional scanning of a paper check which could be called manual or "paper origination" of a check image. The DOC image file may compatibly display the check information such as payment amount, account number and payee name (along with other embedded metadata if required) on the front image of the check using a standard Check 21 TIFF image format. Note that at DOC origination time, the back of the check image may contain no data (i.e., it has a blank back of check image), but subsequent processing of the DOC can generate payee metadata such as deposit account number, signature and instructions such as "for deposit only" which would appear on the back of check image. For example, the EPS 66 can also include UI 68 screens for subsequent processing by the payor.

Figure 5:
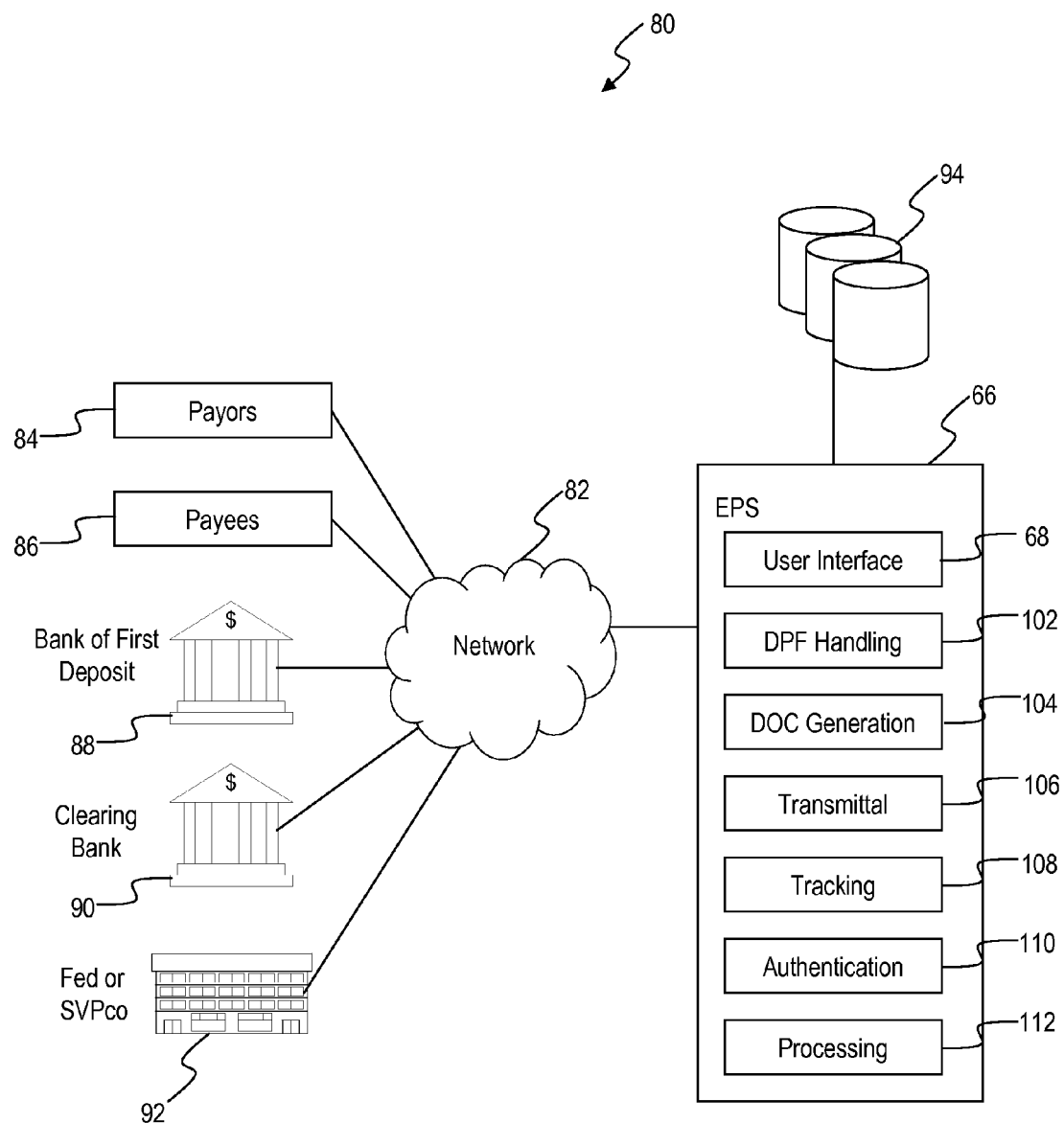
FIG. 5 is an exemplary block diagram of an EPS system according to an exemplary embodiment of the present invention.

Referring to FIG. 5, an EPS system 80 is illustrated according to an exemplary embodiment. As described herein, the EPS 66 is an electronic system configured to interact with a plurality of users (i.e. payors and payees), banks, and other financial institution to enable DOC generation, distribution, tracking, authentication, security, clearing, and the like. The EPS 66 may be configured to communicate over a network 82 to a plurality of payors 84, payees, 86, BOFDs 88, clearing banks 90, clearinghouses 92, and the like. Of note, the exemplary embodiments may allow any payor to create a paperless Check 21 item utilizing the EPS 80. This may provide an anyone-to-anyone or peer to peer (P2P) electronic payment system.

Generally, the EPS 66 is a computer system which can include multiple processing elements, distributed memory, network interfaces, external data storage 94, and the like. The EPS 66 may be configured with processing and data storage redundancy, and may be configured to communicate to the plurality of payors 84, payees, 86, BOFDs 88, clearing banks 90, clearinghouses 92, and the like. The EPS 66 includes various modules, such as the UI 68, DPF handling 102, DOC generation 104, transmittal module 106, tracking module 108, authentication module 110, and processing module 112. As described in FIG. 4, the UI 68 may provide a mechanism for users 84, 86, 88, 90, 92 to create and distribute DOCs. Further, the UI 68 can provide mechanisms for tracking, modification, clearing, processing, security, authentication, depositing, reissuing, and the like with regards to DOCs. Also, the EPS 66 can include mechanisms for automating these processes without the need for direct UI 68 access, such as with automated processing.

The DPF handling 102 module may be configured to create, modify, update, etc. of DPF records associated with specific DOCs. As described herein in FIG. 4, the DPF is a database record storing the metadata instructions related to the DOC. The EPS 66 may be configured to store multiple DPFs in the data storage 94 or the like, and to enable the plurality of payees 84, payors 86, BOFDs 88, clearing banks 90, and clearinghouses 92 to create, transmit, receive, and process the DPFs. The DPF handling 102 module may be configured to create DOCs responsive to user input or through automated processing. Additionally, the DPF handling 102 module assigns the GUID to each DOC at creation based on the algorithms described herein. Also, the DPF handling 102 module manages tracking features, audit features, and the like described further herein. For example, because the DOC is based on metadata, it can be modified after issuance, but before final payment. This can be used for amount corrections, typing errors, and the like, when the DOC is still enroute, but not yet deposited. Similarly, the DOC can be reissued to another party before depositing by the payee. For example, even though a payor has issued the check to one payee, the receiving party (i.e., the payee) can have the check reissued to another payee.

The DOC generation 104 module may be configured to create DOC images with enhanced image quality such that they pass Federal Reserve Image Quality Assessment (IQA) tests without error or corrections required. Because the "bits" or "pixels" of the DOC Check 21 image are generated from the EPS metadata, those bits which should be "black" or "on" are enabled, eliminating background image noise, random bits or errors in the image. A DOC generated image may contain those bits which provide information as defined by the metadata; no extra or random bits may be enabled in the black and white image received by the bank clearing system. Additionally, the image as seen by the payor or payee can have an optional background image, but this image is removed when it is processed by the EPS for transmission to a bank or clearing party. This optional background image allows users to have their favorite image on their check backgrounds yet avoids the well known "puppy and kitty" problem which occurs when paper items containing background images are used as input to Optical Character Recognition (OCR) algorithms which identify the amount of the payment. That is, the optional background image is striped out, leaving a pure black and white image (black metadata on a white background) with no extraneous images or pixels to get in the way of further processing or image testing. Thus, because DOCs may have enhanced image quality, the EPS generated DOC image can easily pass the internal depositing bank's clearing system or the Federal Reserve internal IQA tests (see e.g., www.frbservices.org/Retail/check21TechInfo.html "Black and White Image Standard and Quality Checks" document incorporated fully by reference herein) which measure "noise" as well as "blackness" of an imaged item. Additionally, having optimal image quality eliminates the chance for OCR errors whenever an image file is utilized as a source document for subsequent image processing. Thus DOCs can avoid the well known "copy of a copy of a copy" problem that is inherent in any paper based document processing solution.

Traditionally, Check 21 items are imaged from paper checks which have full rights and responsibilities utilized during the clearing process which are derived from either UCC case law or by the Check 21 act itself (which references UCC law). Note that as passed, the Check 21 act only allows a bank to truncate the check and create a Check 21 item. Comparatively, while the DOC can be transmitted electronically, they can also be used to generate the Check 21 standard "substitute check" or IRD utilizing the X9.140 standard which results in a paper version of the original digital check. The IRD can be printed by the payee and taken into their bank for deposit because it contains a full set of warranties and indemnities based. These full set of warranties and indemnities are based on a contract agreed to by both the payor and the payee which the EPS 66 may need to be signed in order for the DOC to sent or received. Because DOCs may be covered under this contract, they may have a full set warranties and indemnities that are acceptable to BOFDs 88 and downstream clearing banks. This novel DOC feature, i.e. DOCs possessing a "full warranty" state, may differ from other attempts by either businesses or individual consumer users who want to print their own IRD documents and deposit them at a bank because those documents will not be accepted by the BOFD 88 due to the depositing bank's inability to take on un-transferable risk from an unknown originator of the IRD. This scenario is contemplated where an individual or business does not have an existing two-party private warranty contract with their bank which is a concept allowed for under existing UCC law. Also, under the Check 21 regulation as it exists today only banks can truncate checks by imaging them and later extend their warranties to subsequent clearing banks in either electronic or IRD form.

Thus, the exemplary embodiments may eliminate this risk by using a contract which binds the payor and payee to honor the check image or IRD and allow the bank of deposit and subsequent banks to transfer warranties and liabilities back to the responsible parties. That is, the exemplary embodiments may allow a bank of deposit to transfer risk back to the depositor (or the EPS 66 if it chooses to take on that risk) and if necessary all the way back to the original payor even though the payment was made in image or IRD form. The EPS system 80 facilitates this risk transference via the unique tracking identifier (GUID) and internal audit and tracking procedures along with enhanced security features all of which are bundled together in the delivery of the EPS 66 when generating and retrieving a DOC payment. Thus, the EPS system 80 can effectively measure and track their risk and know who is receiving and forwarding these payments and thus responsibly transfer this risk back to the offending party in the event of a dispute or fraudulent situation.

The DOC generation 104 module may be further configured to physically print DOCs in IRD format or as normal paper checks. Further, DOCs in IRD format can automatically be regenerated back into digital form without scanning the IRD paper images utilizing the transaction ID and the EPS. Unlike traditional paper check items which are scanned and then printed in IRD format, the DOC can be re-converted back into digital form at any future date by using the unique transaction identifier (GUID). Note that the DOC check front or back image can be generated in many resolution levels (measured as dots per inch or dpi) which are independent of the chosen bitmap format, such as JPEG, TIFF, PNG, or the like. Second, a DOC image can include optional items which inform and instruct the payee as well as the depositing or clearing bank about the specific payment. Examples of this include merging a "human digitized signature" as the authorized signature directly into the front or back image of the check, even though the paperless Check 21 item was never printed or physically signed (this is accomplished under the e-signature laws using an optional and independent image layer integrated into the Check 21 image) including the statement of "Signature on File". Note that a true, personalized "digitized signature" feature is enabled when the payor or payee has uploaded samples of their human signature or other handwriting samples (e.g., "John Q Public" as their authorized signature) into the EPS. Alternatively, the payor or payee could choose to use a font that displays in "handwriting" format to simulate their human signature or the phrase "signature on file" or the like may be utilized. Any of these methods could satisfy the e-signature law as their authorized legal signature. Thus, the dynamic image form of a DOC file can contain valuable, optional data in both machine and human readable form without requiring paper processing. This feature further automates the processing and handling of checks and speeds up the overall business process between payor, payee and the banking system.

The notification and transmittal module 106 may be configured to handle transmission of DPFs between the various payees 84, payors 86, BOFDs 88, clearing banks 90, and clearinghouses 92. As described herein, each DOC includes a GUID as a unique transaction ID associated with each DPF record. With the exemplary embodiments, a bank teller could verify the legitimacy of the DOC by inputting into the EPS 66 through the UI 68 (e.g., a webpage, automated software program or phone IVR system and the like) the digits from the unique transaction identifier (GUID) which can be found on the IRD. This GUID input system is linked to the EPS 66 that originally generated the DOC for the payor, and which allowed the payee to print the IRD in the first place. The GUID value can be printed and found on the front of the IRD in the X9 "optional data field" location where it was placed during the DOC IRD generation process. The EPS system could check the GUID as input by the teller to acknowledge that a single, valid IRD was available for deposit (blocking attempts by unscrupulous payees to print and then deposit multiple IRDs) or consequently warning the teller not to accept the IRD because it was either an invalid GUID (for fraudulently self-created IRDs) or if the payment has already been deposited or verified.

Also, the exemplary embodiments may utilize a unique multi-part processing mechanism due the electronic nature of the paperless Check 21 item. First, when a payor sends a DOC, the EPS performs multiple dynamic activities unlike the generation of either a paper check or a Check 21 item from a paper check. First, it stores the instructions to pay, and then optionally it can verify the funds are on deposit utilizing a "memo post" or ATM style verification of funds message. Second, the EPS will, at the appointed time, notify the payee that they have a check waiting for them (optionally, payees who are well known to the EPS or who are high volume receivers can have automated depositing linked to payment receipt). The notification concept is similar to getting a phone call from the bank saying that you have a check waiting for deposit. The payee can be notified by various methods including email, a voicemail, an SMS text message, an instant message (IM), a traditional pager message, or a facsimile. Regardless of delivery mechanism, the payee is notified with a message to the effect that "you have money". Third, optional business methods can be applied to the delivery and payment presentment which govern or control how the payment is to be made or received. Finally, the payee can utilize the notification method to retrieve the DOC item by utilizing the GUID to identify the specific payment waiting for them. Thus, paying by DOC provides both the notification of the payment event as well as the ability to transfer the payment value in a single or multiple process or in a manual or automated manner. These exemplary embodiments are unlike paper checks where two steps are mandatory (i.e., creating the value in the check, and then mailing it), these exemplary embodiments can perform both in one step or with optional enhancements along the process.

Using the transmittal module 106, the teller at the BOFD 88 can request that the specific Check 21 item be re-generated as an electronic image file and be sent back into the BOFD 88 for further processing by the "Item Processing" department. To accomplish this regeneration, the EPS 66 can use the teller supplied GUID value to lookup and retrieve the specific DOC metadata information that was stored in the DPF system. As these re-creation requests arrive at the EPS 66, the original metadata values (or the currently stored values) are retrieved from the DPF 70 and used to re-create the digital check file in X9 format for further image exchange processing. This electronic X9 file can then be sent or routed directly back to the BOFD 88 via a secure electronic link such as the existing Federal Reserve System using the standard Cash Letter File format. The ability to re-generate at will (or at any future time) a fully compatible Check 21 digital image without scanning or handling a paper IRD is a further unique element of the exemplary embodiments. The benefits of this feature are derived from the fact that the auto "regeneration" process avoids the errors of paper scanning and is a great benefit to banks in reducing the amount of labor involved in handling of paper items. Thus, there may be no need to scan an IRD submitted for deposit in order to generate the front and back check image in standard Check 21 format. The regenerated image and data values can be generated directly from the EPS 66 and sent back to the BOFD 88 in a standard Cash Letter File for further image exchange processing.

The tracking module 108 may be configured to provide real-time and historical tracking of each DOC created and processed through the EPS 66. The exemplary embodiments may allow the DOC to be generated through the EPS 66 anytime with a full history and audit trail. This may be because the DOC may be electronic and all interaction with the EPS 66 can be recorded, monitored, and tracked through the tracking module 108. Additionally, the DOC can still be processed locally on paper as an IRD, or it can be recreated and sent into a bank again as an electronic item at will. All of these concepts are based on the idea that the DOC is built around the metadata "instructions to pay" which are stored in the DPF, and the tracking module 108 which can track the various payment steps by recording data in the DPF. The tracking module 108 provides similar information as an overnight shipment tracking feature, such as with UPS or FedEx. The DOC issuer can view real-time status related to the DOC to determine when it is received (which can also tie to an auto-notification feature), when it was deposited and optionally, if the EPS maintains the DDA account or has a stored value balance covering the DOC amount under the payors account the payor can be notified when the DOC was paid, as well as if and when it is endorsed to a third party, and the like. Additionally, significant events related to the DOC can be pre-subscribed to auto notify when they occur. For example, the payor can be auto-notified when the DOC is deposited or settled and cleared.

The authentication module 110 may be configured to provide security relative to creation and processing of the DOCs. For example, the EPS 66 uses the GUID to lookup the DOC transaction and determines how to authenticate the payee based on the authentication level chosen by the payor when creating the DOC (or setup by the payee as a condition for retrieving payments from the EPS 66 under a specific name or ID). Authentication levels can include nothing (i.e., just knowing the transaction ID or GUID is enough security for the payor), or requiring a set of unique credentials (e.g., unique account number and login ID into the EPS 66 which utilizes well known PKI methods). Using digital security signature key features (e.g., using a public key cryptography system) allows the EPS to verify and identify both payor or payee as either originator or receiver of the DOC. Also, utilizing public key cryptographic methods allows the EPS to guarantee identifies for non-repudiation all parties known to it and involved in the transaction. Either way, the there can be various levels of security agreed to by one or both parties which are supported by the EPS 66 for authentication.

The processing module 112 may be configured to allow payors 84, BOFDs 88, clearing banks 90, and clearinghouses 92 to process and clear DOCs through the EPS 66. As described herein, DOCs are identified through the GUID or the like. Once identified, the processing module 112 enables forwarding or clearing of the DOC. For example, the processing module can generate the electronic image file and send it to the bank of first deposit for further processing by the "Item Processing" department within the bank. As these re-creation requests arrive at the processing module 112, the original metadata values (or the currently stored values) are retrieved from the system and used to re-create the digital check file in X9 format for further image exchange processing. This electronic X9 file can then be sent or routed directly back to the bank of first deposit via a secure electronic link such as the existing Federal Reserve System using the standard Cash Letter File format. The regenerated image and data values can be generated directly from the EPS 66 and sent back to the bank of first deposit in a standard X9.180 Cash Letter File for further image exchange processing. Thus, this further demonstrates that any items produced by the exemplary embodiments may be built using a fully Check 21 compliant process from electronic metadata (instructions to pay) stored in a database (DPF) instead of scanning paper or existing check image data. Since DOCs clear through system as digitally originated, they do not need Item Processing (sorting, etc.) to be cleared. All of the info needed to clear or process a check is stored in the DPF, therefore the DOC can be forwarded onto the Fed network or the clearing bank automatically by the receiver (BOFD) or any independent Check 21 image service which performs the Electronic Payments Clearing House functions (EPCH).

Additionally, the EPS 66 can provide a more efficient mechanism for stop payment of DOCs. Canceling a paper check is inconvenient and often not mandatory. For example, the payor has to go down to the bank, sign a form, and hope to catch the check in time. With a DOC, the payor can cancel it immediately, or put it on hold, etc. through the EPS 66. Also, the payor can permanently void the DOC, and a new GUID would be issued if the check is re-issued. Advantageously, this allows the payor to know if a DOC is canceled prior to issuing another in replacement. It's fast, easy and immediate—features that allow check payments to better compete with the other electronic payment clearing mechanisms under the NACHA ACH system.

Also, the EPS 66 and the processing module 112 can utilize a unique, automatically-generated payor Positive Pay Database (PPD). Traditionally, only corporate customers who have a Treasury Management account feature tied to their high value business DDA account have been able to tell the banks which checks to pay and which ones not to pay (i.e., positive or negative pay lists). The Positive Pay Database (PPD) is an automatic feature of DOC creation, i.e. the EPS 66 knows it was created, therefore the EPS 66 knows which "checks" to pay, authenticated and genuine issued DOCs can be cleared, thus consumers have PPD features that businesses have had for years. Thus using an internal PPD, and the EPS 66 also has the ability to send DOC creation info (PPD) out to a clearinghouse (EPCH) so that external users can verify a good check (e.g., traditionally banks won't tell external receivers about PPD info but the EPS 66 can with the PPD feature). External PPD info can also be issued from financial accounting software to the EPCH. Use of strong security and non-repudiation mechanisms provided by public key cryptographic systems can provide an additional level of security, audit and tracking features to DOCs. Note that once a DOC is issued and possibly digitally signed by a payor there is an automatic Positive Pay Database feature established. Whenever a check needs to be verified before it can be issued as an IRD or cleared, at a minimum the EPS can use the check number, GUID or transaction code provided to it and compare it to the known values stored in the DPF. Having additional levels of security allows even stronger levels of authentication and verification to occur. But at a minimum, the EPS can use the GUID to see if it the requested item is indeed a valid DOC and also verify that it has not already been cleared. Thus, under ideal conditions involving PKI and secure authentication methods, one DOC will clear as a payment.

Figure 6:
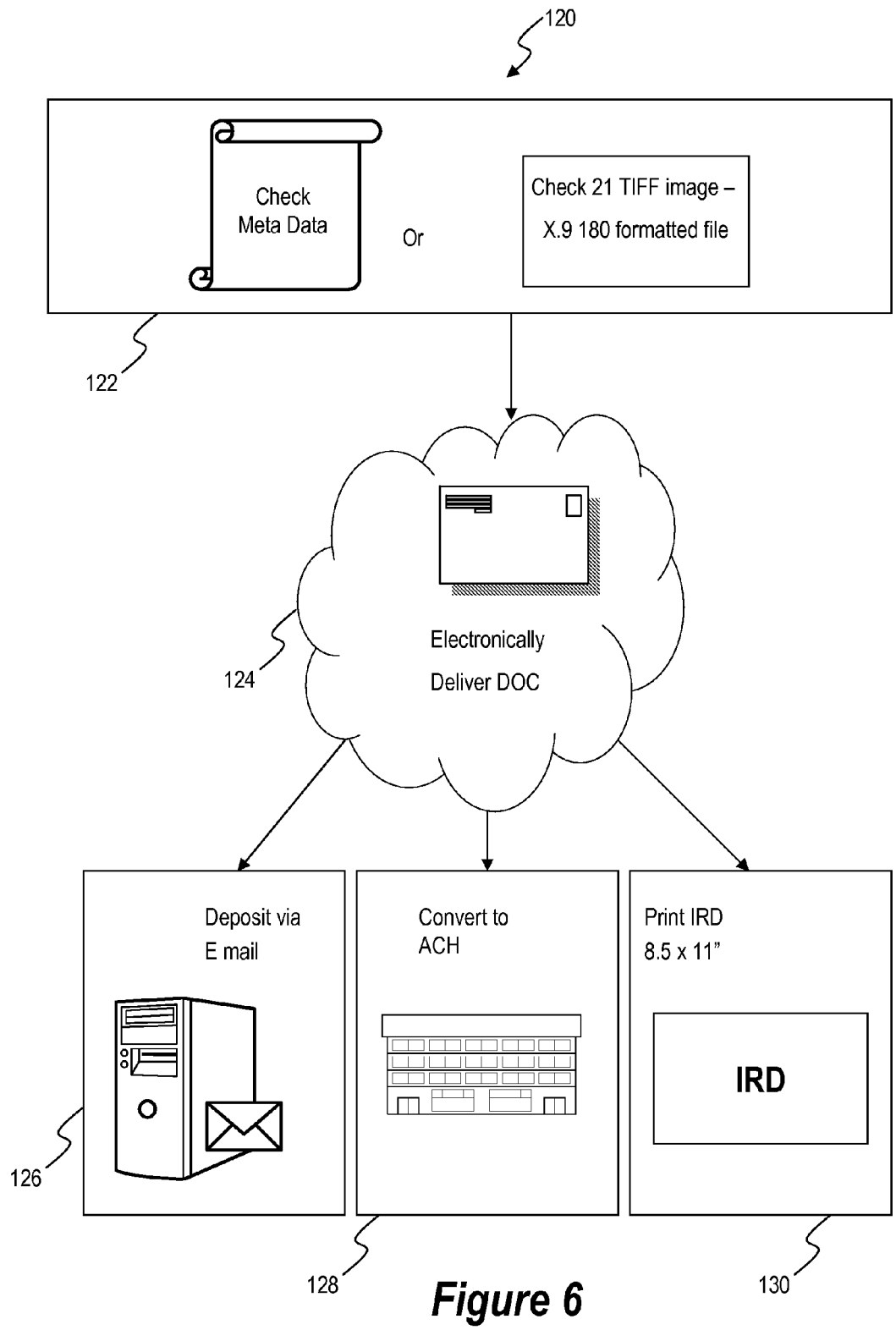
FIG. 6 is an exemplary flowchart of a DOC delivery system according to an exemplary embodiment of the present invention.

Referring to FIG. 6, DOC notification and delivery 120 is illustrated according to an exemplary embodiment of the present invention. The DOC may be generated either through check metadata or printed in a Check 21 image according to X9.180 file format (step 120). The generation of the DOC can utilize the various mechanisms described herein. A DOC availability notice or message can be sent to the payee via a variety of methods, similar to the delivery methods. The DOC payment is delivered electronically (step 124) or it can be printed as an IRD and mailed to the payee using the metadata containing an USPS or street address for physical delivery. Since the DOC is in digital form (i.e., not an IRD), it can be sent through many delivery mechanisms (unlike paper which must be physically transported). Of note, the exemplary embodiments also contemplate a variety of mechanisms or forms of DOC electronic notification and delivery which can include, email with a URL linking back to the DOC or the actual IRD image can be embedded as an email attachment, or as email with an attached file (such as PDF with an embedded Check 21 image), or email with an encrypted Check 21 file, or via a URL embedded in an IM or for mobile payments to a cell phone via an SMS text message with a GUID or with an embedded URL and the like. This idea can eliminate paper printing, postage, transport costs, handling, storing, securing, processing/sorting of physical items. Advantageously, the exemplary embodiments may utilize existing software for distribution without requiring client software to be installed. For example, the present invention utilizes secure PKI or SSL methods along with existing "viewers" such as Adobe Reader and the like which are commonly available on computing platforms to securely deliver the DOC.

Alternatively, the IRD printing method can be used to deliver a paper check using the existing "remote IRD" printing facilities offered by third party vendors such as FiServ for delivery to non-image enabled banks or to payees who are not familiar with electronic delivery options including payees without email addresses. Alternatively, exemplary embodiments contemplate transmission using a perfectly formatted IRD from a computer to a facsimile machine. This can be used when the payor does not have computer or email access. For example, a payor could fax a check to a payee, such as at a UPS mail store, and they can pickup the check as an IRD and go deposit or cash it. This can also be done in the form of a DOC converted into a money order and sent directly to a check cashing store or Western Union office and the like. Advantageously, all of these methods can be used by payors or payees to eliminate the need for "overnight delivery" of checks.

Once received, the payee has several options on how to proceed with the DOC, such as deposit via email (step 126), conversion to ACH (step 128), and printing an IRD (step 130). Once the payee has been notified, the payee uses the unique transaction ID (GUID) which was provided to them in the notification message to identify which specific DOC they wish to retrieve. The EPS uses the GUID to lookup the DOC transaction and determine how to authenticate the payee based on the authentication level chosen by the payor when sending the DOC (or setup by the payee as a condition for retrieving payments from the EPS under a specific name or ID). After satisfying the authentication and security tests, the payee has a choice in how to proceed with the depositing or clearing the payment for credit to their account. After retrieving the DPF record for the specific DOC (using the GUID), the EPS can generate a DOC image (in Check 21 image format) and display it directly onto a website page in order to present to the payee with the specific check image for the payment they have received. Viewing a payment in check image form allows the payee to confirm that this is indeed the payment they expected, that it has the correct payee name or identifier on it, it has the correct value amount and has other optional business rules and processes attached to the payment which the payee can confirm prior to depositing the payment.

After reviewing the DOC on the EPS, the payee may have a choice in how to proceed with claiming their payment. The first and simplest choice, under the contract governing the DOC, is that the payee can choose to print the DOC using the X9.140 format as an IRD onto paper using their own printer and then deposit it at a bank teller's window like a traditional paper check. Alternatively, the payee can have the EPS "forward" the DOC electronically into their bank as an electronic Cash Letter File for deposit saving the time and effort of a trip to the bank. This forwarding can take a variety of forms, but the simplest being having the EPS connect directly to the clearing network and sending an appropriately filled out X9.180 Image Cash Letter file along with the payee's deposit ticket information for routing to the BOFD. Other forms of depositing a payment can be supported by the EPS including converting the DOC into a non-check form of payment such as an ACH item and the like for deposit.

The exemplary embodiments can enable a true "Remote Deposit" scenario. This DOC based remote deposit is accomplished via a Check 21 cash letter file with an image for each DOC that a payee receives—there is no paper item to scan, convert or truncate. This is not the same as the existing "Remote Deposit" concept where a customer writes a paper check at checkout or sends into a lockbox service and the merchant scans the MICR line to perform an ACH "POP" or "ARC" truncation. This is because the exemplary embodiments may utilize no paper, no scanning, and can do remote deposit anywhere with no POS equipment needed. This method can also move more of the original check payment volume back into the check clearing methods and avoids the consumer's reluctance of having their checks truncated into ACH items. Using the GUID and the EPS website, a user can remotely push the DOC into their bank account, electronically as a check via the standard Check 21 image exchange systems.

Figure 7:
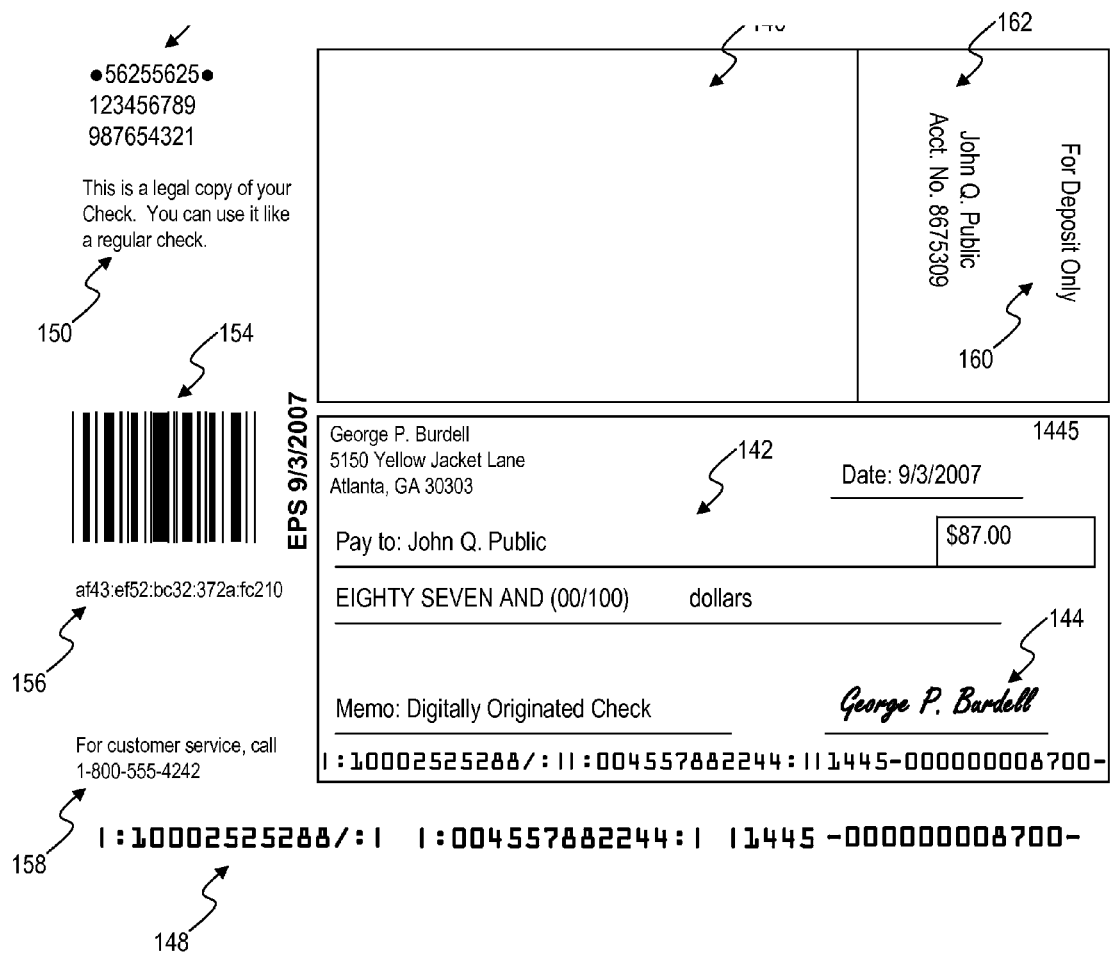
FIG. 7 is an exemplary illustration of a generated DOC image according to an exemplary embodiment of the present invention.

Referring to FIG. 7, a generated DOC image 140 is illustrated according to an exemplary embodiment. While the DOC can be transmitted electronically, it can also be used to generate the X9.140 standard "substitute check" or IRD which results in a paper version of the original digital check. The IRD can be printed by the payee and taken into their bank for deposit because it contains a full set of warranties and indemnities based on the original contract agreed to by the payor and payee which the EPS may need to be signed in order for the DOC to sent or received. Because DOCs are covered under this contract, they have a full set warranties and indemnities that are acceptable to both banks of deposit and downstream clearing banks. This DOC feature of possessing a "full warranty" state differs from other attempts by either businesses or individual consumer users who want to print their own IRD documents and deposit them at a bank because those documents will not be accepted by the bank of first deposit due to the depositing bank's inability to take on un-transferable risk from an unknown originator of the IRD.

The DOC image 140 may be formatted similar to a standard X9.140 IRD including a standard check front 142 with a digital signature 144 and a standard check back 146. Additionally, the image 140 includes a Magnetic Ink Character Recognition (MICR) line 148 and a legal legend 150 as required by Check 21. Further, the DOC image 140 can utilize the X9.140 "optional data" area to include routing information 152 associated with the EPS, a two-dimensional barcode 154 to facilitate faster processing and security, a GUID 156, and customer service information 158. The routing information 152 can be used by itself or in conjunction with the GUID 156 to allow the EPS to track and perform other functions with the DOC image 140. The barcode 154 can be used in conjunction with a barcode reader to read all of the information associated with the DOC image 140. The GUID 156 provides the unique transaction ID associated with the DOC image 140 and the corresponding DPF. Finally, the information 158 can be used by banks and others to assist with issues or questions related to the DOC image 140. The security information associated with the DOC in the DPF, such as through the GUID 156 and barcode 154, is operable to prevent tampering with the payment instructions and the substitute check.

The GUID 156 may be a large, algorithmically generated, unique number. The mechanism may use a given set of inputs as seed values and then generates a 16-byte (128-bit) number which is generally considered to be unique among all users at any time, everywhere on the planet. Using GUIDs 156 as either hidden or visible check numbers ensures that the EPS knows which DOC has been issued, cleared, etc. and facilitates tracking the check anywhere, anytime, electronically or by IVR (phone) or human lookup. This can be unlike preprinted check numbers as they are generated on the fly at DOC creation time. A GUID 156 can also serve as a Transaction ID (Tx) to find/locate a specific check within all the checks. GUIDs 156 can also be captured and stored inside the PDF417 barcode embedded on an IRD or check image for automated IRD processing.

The exemplary embodiments may provide DOC images 140 with superior quality and characteristics. Using a traditional scan of a paper check, a high speed reader/sorter machine takes a picture of the front and back of a check. Several errors can be introduced during this mechanical paper handling process which impact further electronic processing of the image and subsequent Check 21 item. Due to inherent mechanical and optical system design defects, any mechanical paper handling process is subject to jams, miss-feeds and misalignments of the paper which result in either missing images or bad quality images (blurry) or miss-aligned images (alignment measured as degrees off or away from a horizontal axis—called skew). The impact of these scanning flaws, while rare on a percentage basis, occur so frequently in the huge volume of paper checks that the Federal Reserve system has mandated the adoption of an "Image Quality Assessment" (IQA) test before they will accept and process a set of Check 21 images from any bank. Thus the IQA tests are designed to identify and reject images which do not conform to both the Check 21 standard overall as well as the specific "readability" or "legibility" OCR tests that the banking industry has agreed are minimum image requirements.

The digital generation of the DOC image 140 may have none of the traditional paper image quality errors. Second, because there is no paper item to scan, there is no resulting image skew from a non-existent horizontal axis based on the edge of the paper. The DOC image 140 may be generated with zero degrees of skew in the image. Next, the DOC image 140 has enhanced image quality as measured by industry standard Image Quality tests which is independent of dpi resolution due to the fact that a pure black and white bitmap is generated from metadata and not from a scanned paper item (which results in noise being introduced by the surface of the paper item). With the DOC image 140 there are no stray black noise elements, however, the exact letters, numbers, fonts, and graphics which are present. The metadata instructions generate individual black bits in the bitmap. Because the DOC image 140 files have exact image quality (pure black and white with no random image noise), and have zero degrees of skew (i.e. they are perfectly aligned to the horizontal axis of the image file), they are always readable by both humans and computers using the lowest dpi image resolution form of Check 21. Thus, this enhanced readability may reduce the chances of OCR errors of the Courtesy Amount Recognition (CAR) and Legal Amount Recognition (LAR) fields if the check image is scanned by banks who still handle paper IRDs. Finally, the well known industry problem of background image "interference" (this generically is called the "puppy and kitty" problem due to the wide spread existence of these type of background images on many consumer checks) is also avoided because the DOC image 140 does not contain any background data.

Further, current Item Processing, check sorting, and encoding methods may need the imaging system to validate and compare the Courtesy Amount box with the Legal Amount field and use OCR to determine the Amount to Pay. These algorithms are not perfect and they can mistake a handwritten "7" for a "1" for example. These are called substitution errors and banks want to keep these errors as low as possible to ensure that the encoded amount on the MICR line is correct and that their systems are in balance. Having OCR errors forces banks to keep human operators around to compare by hand these amounts and correct these errors. DOCs images 140 are generated from digital instructions, so if they person enters a "7" they will get the image of a "7" on the digital check image.

Because a DOC may be generated from metadata, it can be generated in many forms. First, the DOC image 140 can be generated in many resolution levels (measured as dots per inch or dpi) which are independent of the chosen bitmap format, such as JPEG, TIFF, PNG, and the like. Second, when the DOC image 140 is generated by the EPS, it can be generated to include optional data such as human signatures for easier processing in paper form. This optional or conditional data (on the front or back) can include instructions from the payee or depositing bank about depositing or clearing features of the specific payment. Examples of this include merging a "human digitized signature" 144 as the authorized signature directly into the back (or front) image of the check, even though it was never printed or signed (using the e-signature laws). Note that this "digitized signature" feature works if the payor or payee has uploaded samples of their human signature or other handwriting samples (ex. Agreed and Accepted), or they could choose to use a font that displays in "handwriting" format to simulate their human signature, or the phrase "signature of file" and the like is used—any of these could satisfy the e-signature law as their authorized legal signature. Another example includes a "for deposit only" style stamp 160 for the back of the check, an account number for the deposit 162, or other contractual restrictions (such as agreement to a contract if the check is deposited) that are needed by certain business processes or agreements. Thus, the image 140 form of a DOC file can contain valuable, optional data in both machine and human readable form without requiring paper processing. This further automates the processing and handling of checks and speeds up the overall business process between payor, payee, and the banking system.

The DOC can be created from "instructions to pay" which are similar in features to a "vector image file" vs. a "raster image file". The benefits of using metadata (like the equations describing a vector) to generate a DOC image is that it provides flexibility in how the image 140 is generated. For example, under X9 standards a Check 21 image is required to be a Black and White (B/W) 200 dots per inch TIFF image. Using the DOC embodiment, the EPS can generate DOC images 140 in a variety of formats such as small X9 B/W images which reduces the file size of a DOC or as a high resolution JPEG images using a grayscale format for enhanced readability or clarity. Dynamically creating the "check image" gives the system flexibility and choices which are suitable to the parameters of the final use or format. Thus for storage, a DOC image can be made as small as possible given the amount of check data that must be displayed. This is useful for banks storing large numbers of check images. Additionally, the DOC image 140 can include low resolution image versions for creating IRDs and high resolution used for customer statement presentment or online viewing. An EPS can also produce DOC images at whatever resolution (or format—TIFF, JPG, PNG, etc.) is needed by the requesting system for storage or printing. The DOC record, i.e. DPF, does not contain an image, but may include instructions to pay, thus any image type can be generated on the fly as needed. Also, the DOC record is very small (e.g., a few hundred bytes vs. a few hundred kilobytes for an image) which can be stored very inexpensively and converted into larger formats for different purposes. This eliminates the need for banks to use check image storing services such as ViewPointe. Instead, when needed in the future, the DOC image can be pulled back into the bank to be used for customer statement processing, dispute resolution or legal evidence, etc.

Similar to "electronic endorsement" features, using metadata and other digital technologies, any bank department or receiver of the DOC can automatically sign or endorse the check for processing and clearing after the DOC is deposited. This idea covers the bank stamps, time stamps and automation tracking features used to update the Check 21 item throughout its lifecycle. Using these concepts, the EPS can generate an image showing who signed the check, when it was deposited, how it was deposited or notify a payee that the item is a item returned under NSF rules, etc. The EPS updates the audit trail in the database of DOC history. The generation of multiple image forms utilizes a concept of an "image overlay" to add layers of digital stamping to the back of a check. This is not manipulation of the existing image, but instead generating each stamp in its own image layer one at a time by providing an "image overlay" layer on top of the existing DOC back of check image 146. Note that at DOC creation time, the back of a DOC image 146 is a blank image of a check back. Other unique elements of this feature are the idea of having room for "more than one" signature when multiple endorsements are needed or used, such as a third party check turned over to a store. The last signature is shown on the back of check image 146, others are kept on file in metadata, or a statement can be added saying "signature is on file" and produced as needed. The same idea can apply to bank processing of DOCs, their "stamps" can be digitally added and the last one is shown if desired or if no room or if illegibility would be created by stamping over top of each other. For example, the most recent image can be kept in the display, but all other images are on file. This is also useful for NSF checks to explain why the item was returned. Check 21 provides for items returned as NSF, but the exemplary embodiments may make it clear to all parties what occurred and when no matter how many back and forth attempts were made to cash the check. Another benefit is the franking features are always clear and readable, thus there is no need for a "high resolution" image of the back of the check.

The exemplary embodiments presented herein can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus or device. The medium can be electronic, magnetic, optical, electromagnetic, infrared, or semiconductor system (or apparatus or device) or a propagation medium. Non-limiting examples of a computer-readable medium include a semiconductor or solid state memory, magnetic tape, a removable computer diskette, a random access memory (RAM), a read-only memory (ROM), a rigid magnetic disk and optical disk. Current examples of optical disks include compact disk—read only memory (CD-ROM), compact disk—read/write (CD-R/W) and DVD. Further, exemplary embodiments include or incorporate at least one database which may store software, descriptive data, system data, digital images and any other data item required by the other components necessary to effectuate any embodiment of the present system and method known to one having ordinary skill in the art. The databases may be provided, for example, as a database management system (DBMS), a relational database management system (e.g., DB2, ACCESS, etc.), an object-oriented database management system (ODBMS), a file system or another conventional database package as a few non-limiting examples. The databases can be accessed via a Structure Query Language (SQL) or other tools known to one having skill in the art.

Although the exemplary embodiments have been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the exemplary embodiments and are intended to be covered by the following claims.

What is claimed is:

1. A paperless check method, comprising:
  (a) presenting a payor with a set of warranties and indemnities applicable to banks of first deposit and clearing banks, wherein the set of warranties and indemnities enable a check to be created, exchanged, and cleared electronically between the payor and a payee and through the banks of first deposit and clearing banks;
  (b) creating a digitally originated check;
  (c) receiving an acceptance from the payor of the set of warranties and indemnities;
  (d) receiving a payment instruction from the payor to the payee, wherein the payment instruction is subject to the set of warranties and indemnities;

(e) capturing metadata associated with the digitally originated check, wherein the metadata comprises the payment instruction, a globally unique identifier, tracking information, and security information;

(f) performing one or more of immediately notifying the payee of the digitally originated check and notifying the payee of the digitally originated check at a later time; and (g) verifying the digitally originated check responsive to the globally unique identifier and the security information prior to depositing or cashing the digitally originated check;

wherein an output from the metadata is interoperable with both paper and electronic clearing methods associated with check clearing systems;

wherein the digitally originated check is a check comprising the warranties and indemnities created by the payor without an original paper check when the payee accepts the warranties and indemnities thereby enabling electronic presentment from the payor to the payee;

wherein the warranties and indemnities, the globally unique identifier, and the security information provide risk transference mechanisms for the digitally originated check between the payor, the payee, and the banks of first deposit and clearing banks; and wherein steps (a) through (g) are executed on a electronic payment computer system connected to a network.

2. The paperless check method of claim 1, further comprising:

authenticating the payee through the electronic payment computer system;

presenting the payee with the set of warranties and indemnities;

receiving an acceptance from the payee of the set of warranties and indemnities thereby creating a contractual relationship between the payee and the payor for the set of warranties and indemnities applicable to banks of first deposit and clearing banks;

and performing one of electronically forwarding the metadata to a bank of first deposit as an electronic Cash Letter File and printing a substitute check from the metadata.

3. The paperless check method of claim 2, wherein the security information is operable to prevent tampering with the payment instructions and the substitute check.

4. The paperless check method of claim 2, further comprising electronically endorsing the digitally originated check, wherein the endorsement is stored in the metadata, and wherein the substitute check is printed with the endorsement, bank stamps, time stamps, and tracking utilizing an image overlay.

5. The paperless check method of claim 1, wherein the payment instructions comprise any of conditions, limitations, restrictions, and conditional acknowledgements comprising business rules governing payment terms.

6. The paperless check method of claim 1, wherein the tracking information is operable to provide an audit history of the digitally originated check; and wherein the risk transference mechanisms enable tracking of who is receiving and forwarding the check and thus responsibly transfer this risk back to an offending party in a dispute or fraudulent situation.

7. The paperless check method of claim 1, wherein the security information comprises a personal identification number defined by the payor for secure retrieval by the payee.

8. The paperless check method of claim 1, wherein the verifying step comprises public key cryptography.

9. The paperless check method of claim 1, further comprising:

printing a substitute check from the metadata, wherein the substitute check is printed with zero degrees of skew and with substantially no stray noise.

10. The paperless check method of claim 1, further comprising:

canceling the digitally originated check through the computer system, wherein the cancelation is performed immediately.

11. The paperless check method of claim 1, further comprising:

utilizing a positive pay database to determine whether the digitally originated check is valid prior to payment.

12. The paperless check method of claim 1, further comprising:

(e) authenticating the payee; and (f) converting the metadata into an Automatic Clearing House item.

13. A paperless check system, comprising:

(a) data storage comprising a metadata file, wherein the metadata file is associated with a digitally originated check, and wherein the metadata file comprises a payment instruction, a globally unique identifier, tracking information, and security information;

(b) a network interface connected to the data storage;

(c) a processor connected to the network interface and the data storage, wherein the processor is configured to:

(i) present a set of warranties and indemnities applicable to the payor;

(ii) receive acceptance of the set of warranties and indemnities from the payor;

(iii) receive payment instructions from the payor;

(iv) create the metadata file with the payment instruction from the payor;

(v) generate and assign the globally unique identifier to the metadata file;

(vi) notify a payee of the metadata file associated with the digitally originated check;

(vii) track the digitally originated check and update the metadata file with an audit history of the digitally originated check;

(viii) authenticate the digitally originated check; and (ix) verify the digitally originated check responsive to the globally unique identifier and the security information prior to depositing or cashing the digitally originated check;

wherein the set of warranties and indemnities enable a check to be created, exchanged, and cleared electronically between payor and payee and through associated banks of first deposit and clearing banks;

wherein the digitally originated check is a check backed by the warranties and indemnities created by the payor without an original paper check when the payee accepts the warranties and indemnities thereby enabling electronic presentment from the payor to the payee;

wherein the warranties and indemnities, the globally unique identifier, and the security information provide risk transference mechanisms for the digitally originated check between the payor, the payee, and the banks of first deposit and clearing banks; and wherein an output the metadata file is interoperable with both paper and electronic clearing methods associated with check clearing systems.

14. The paperless check system of claim 13, wherein the processor is further configured to:
   authenticate the payee associated with the metadata file;
   present the payee with the set of warranties and indemnities;
   receive acceptance of the set of warranties and indemnities from the payee thereby creating a contractual relationship between the payee and the payor for the set of warranties and indemnities applicable to banks of first deposit and clearing banks; and
   (xii) perform one of electronically forwarding the metadata file to a bank of first deposit as an electronic Cash Letter File and printing a substitute check from the metadata file.

* * * * *